United States Patent
Palmai

[15] 3,669,144
[45] June 13, 1972

[54] OIL FILTER
[72] Inventor: Robert Palmai, Preston, Ontario, Canada
[73] Assignee: Sheller-Globe Corporation, Detroit, Mich.
[22] Filed: June 8, 1970
[21] Appl. No.: 56,995

Related U.S. Application Data
[62] Division of Ser. No. 781,135, Dec. 4, 1968.

[52] U.S. Cl. ............................137/525, 210/130, 137/525.1
[51] Int. Cl. ............................................................F16k 15/14
[58] Field of Search ..............137/525, 512.15, 512.4, 525.1; 210/130

[56] References Cited
UNITED STATES PATENTS
3,231,089  1/1966  Thornton ..............................137/525

Primary Examiner—Samuel B. Rothberg
Assistant Examiner—William H. Wright
Attorney—Barnes, Kisselle, Raisch & Choate

[57] ABSTRACT

An oil filter including a casing having a filter element therein. The casing has a bottom wall with a centrally located egress opening and a plurality of circumferentially spaced entrance openings surrounding the egress opening. A pressure relief valve is interposed between the lower end of the filter element and the egress opening and a resilient anti drain back valve is interposed between the back pressure valve and the bottom wall in overlying relationship to the spaced entrance openings.

2 Claims, 3 Drawing Figures

PATENTED JUN 13 1972

3,669,144

INVENTOR
BY ROBERT PALMAI

Barnes, Kisselle, Raisch & Choate
ATTORNEY

OIL FILTER

This application is a division of application Ser. No. 781,135, filed Dec. 4, 1968.

This invention relates to oil filters.

Among the objects of the invention are to provide an oil filter having a novel anti drain back valve which is made in a single piece; which can be manufactured at relatively low cost; and which will effectively function to prevent drainage of the oil back out of the filter when the vehicle to which the oil filter is attached is not operating.

SUMMARY OF THE INVENTION

Basically, the invention comprises an oil filter including a casing having a filter element therein. The casing has a bottom wall with a centrally located egress opening and a plurality of circumferentially spaced entrance openings surrounding the egress opening. A pressure relief valve is interposed between the lower end of the filter element and the egress opening and a resilient anti drain back valve interposed between the back pressure valve and the bottom wall in overlying relationship to the spaced entrance openings.

DESCRIPTION

Figure 1:
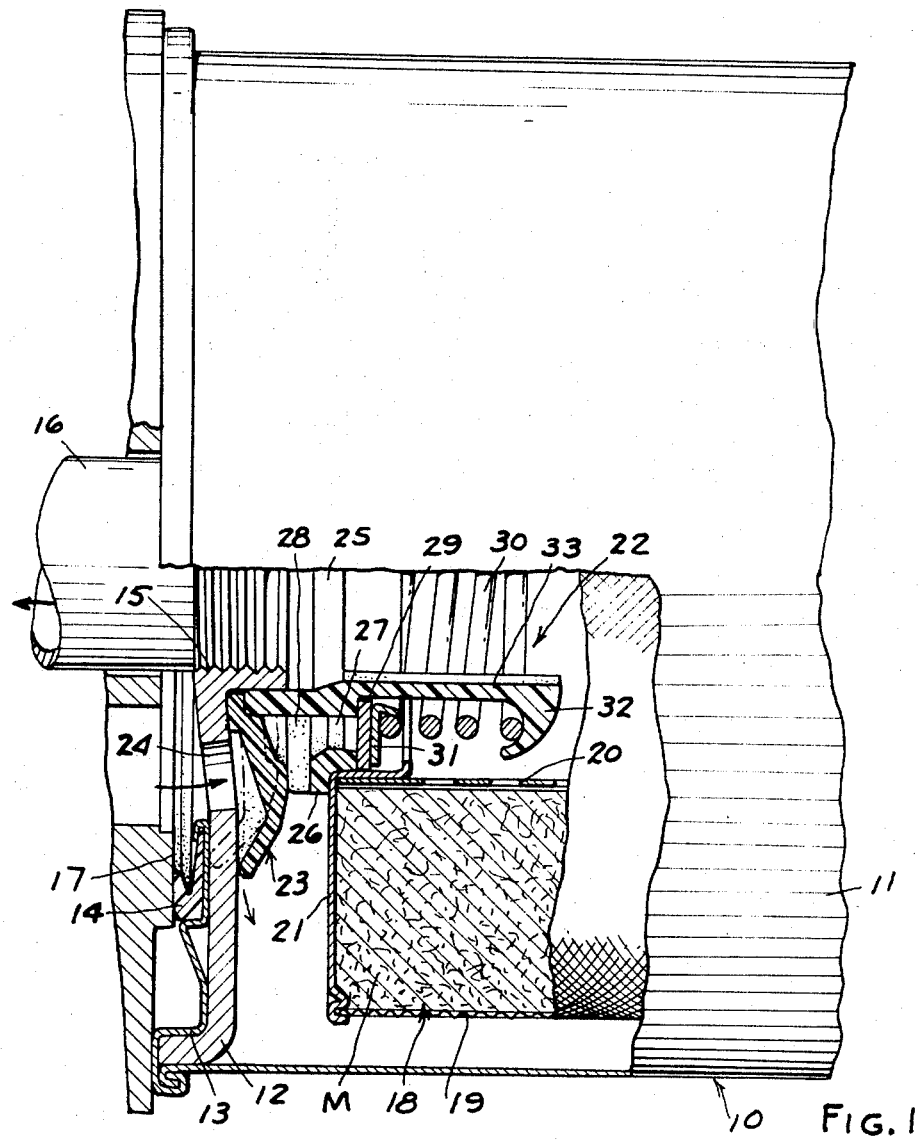
FIG. 1 is a fragmentary part sectional view of an oil filter embodying the invention.

Referring to FIG. 1, the oil filter 10 comprises a casing including a cylindrical wall 11 and a bottom wall, or mounting plate, 12 that is held in position on the wall 11 by a crimped cap or end plate, 13 which, in turn, supports a resilient gasket 14. Mounting plate 12 has a centrally provided egress opening 15 which is threaded for engagement with a pipe 16 of the oil system of a vehicle. When the oil filter is threaded on the pipe 16, the gasket 14 engages a sealing surface 17 on the vehicle.

An oil filter element 18 comprising spaced foraminous walls 19, 20 and imperforate end walls 21 and filter material M filling the casing is provided within the casing. A pressure relief valve 22 is interposed between the opening 15 and the lower end of the filter element 21 to provide egress of the oil if the pressure exceeds a predetermined value. An anti drain back valve 23 is interposed between the pressure relief valve 22 and the mounting plate 12 and controls the flow through circumferentially spaced entrance openings 24 which surround the opening 15. When the engine is operating, oil flows through the openings 24 and between the anti drain back valve 23 and the mounting plate 12 to the interior of the casing through the filter element 18 and thereafter axially through the outlet or egress opening 15.

The pressure relief valve 22 is preferably of the type shown in the U.S. Pat. to Havelka et al. No. 3,156,259, issued Nov. 10, 1964, and comprises a cylindrical plastic sleeve portion 25 having an integral flange 26. Flange 26 is formed with circumferentially spaced axial openings 27. The underside of flange 26 is formed with circumferentially spaced radially extending ribs 28 that define radial passages that, in turn, extend to the openings 27. A valve seal or plate 29 is yieldingly urged against the upper surface of the flange 26 to close the openings 27 by spring 30 that is interposed between a pressure member 31 and hooks 32 formed on the ends of axial extensions 33 which are integral with the cylindrical portion 25.

Figure 2:
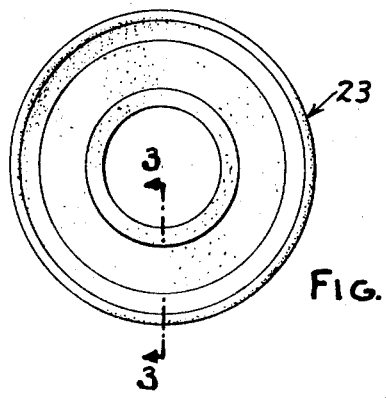
FIG. 2 is a plan view of a portion of the oil filter shown in FIG. 1.
Figure 3:
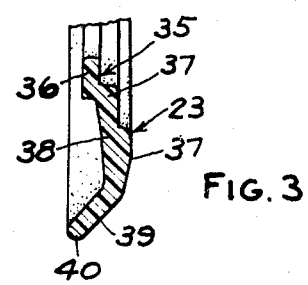
FIG. 3 is a fragmentary sectional view taken along the line 3—3 in FIG. 2.

As shown in FIGS. 2 and 3, the anti drain back valve 23 is made from a one piece body of resilient material such as oil resistant rubber and comprises a central portion 35 that includes a first annular fixed part 36 extending radially and a second axial part 37. The valve member 23 further includes a wall portion 37 extending from axial part 37 which includes a first portion 38 extending generally radially outwardly and a second portion 39 that extends radially and axially outwardly with its periphery in sealing engagement with the inner surface of the mounting plate 12.

The valve member 23 is mounted in position with the portion 36 interposed between the end of the cylindrical portion 25 and the inner surface of the mounting plate 12 and with the radially innermost surface of the portion 37 sealingly engaging the outer surface of the cylindrical portion 25. As shown in FIGS. 1 and 3, the center part of the portion 38 is axially thickened.

When installed in the filter, the periphery 40 of the element sealingly engages the inner surface of the mounting plate 12 and prevents oil from flowing back to the engine. When the engine is operating, the pressure of oil from the engine lifts the peripheral portion of the element 23 away from the surface of the mounting plate 12 permitting the oil to pass to the filter element.

What is claimed is:

1. An anti drain back valve comprising
    a generally annular one piece body of resilient material including a central portion having a first generally radial part,
    and a second generally axial part extending from the outer periphery of said first radial part,
    and an annular generally radially extending wall portion extending from said second axial part, said radially extending wall portion including a first intermediate portion extending radially outwardly from the end of said axial part which is remote from said first radial part,
    and a second peripheral portion extending outwardly and axially through the plane of the first radial part.

2. The combination set forth in claim 1 wherein said first portion of the wall is thickened in an axial direction.

* * * * *